(12) United States Patent
Staigl, III et al.

(10) Patent No.: US 7,898,131 B2
(45) Date of Patent: Mar. 1, 2011

(54) EXTERNAL VOLTAGE CHANGE DEVICE

(75) Inventors: Frank E. Staigl, III, Greenville, OH (US); Ngan-Fai Leung, Englewood, OH (US); Dennis Studebaker, Tipp City, OH (US); Dennis Bush, Troy, OH (US)

(73) Assignee: A.O. Smith Corporation, Milwaukee, WI (US)

( * ) Notice: Subject to any disclaimer, the term of this patent is extended or adjusted under 35 U.S.C. 154(b) by 331 days.

(21) Appl. No.: 12/168,674

(22) Filed: Jul. 7, 2008

(65) Prior Publication Data

US 2010/0001598 A1   Jan. 7, 2010

(51) Int. Cl.
*H02K 11/00* (2006.01)
(52) U.S. Cl. ..................................... 310/71
(58) Field of Classification Search .............. 310/71, 310/184, 198
See application file for complete search history.

(56) References Cited

U.S. PATENT DOCUMENTS

| | | | |
|---|---|---|---|
| 1,909,497 A | 5/1933 | Nielsen |
| 2,057,525 A | 10/1936 | Horning |
| 2,230,581 A | 2/1941 | Avigdor |
| 2,460,415 A | 2/1949 | Gaylord et al. |
| 2,922,054 A | 1/1950 | Miller |
| 2,619,621 A | 11/1952 | Brown |
| 2,652,506 A | 9/1953 | Furnas et al. |
| 2,722,645 A | 11/1955 | Brown |
| 3,160,460 A | 12/1964 | Wyzenbeek |
| 3,210,578 A | 10/1965 | Sherer |
| 3,231,767 A | 1/1966 | Powell |
| 3,384,729 A | 5/1968 | Burris, Jr. et al. |
| 3,652,812 A | 3/1972 | Ristuccia |
| 3,719,163 A | 3/1973 | Jedynak et al. |
| 3,767,880 A | 10/1973 | Austin |
| 3,831,125 A | 8/1974 | Brundage et al. |
| 3,850,496 A | 11/1974 | Hague |
| 3,983,428 A | 9/1976 | Bitsch et al. |
| 4,038,574 A | 7/1977 | Crow et al. |
| 4,131,033 A | 12/1978 | Wright et al. |
| 4,167,658 A | 9/1979 | Sherman |
| 4,406,933 A | 9/1983 | Boozer |
| 4,559,419 A | 12/1985 | Overman et al. |
| 4,593,163 A | 6/1986 | Fisher |
| 4,748,355 A | 5/1988 | Anderson et al. |

(Continued)

FOREIGN PATENT DOCUMENTS

DE    1057198    5/1959

*Primary Examiner*—Dang D Le
(74) *Attorney, Agent, or Firm*—Michael Best & Friedrich LLP

(57) ABSTRACT

A motor including a stator, a first connector portion, a selector, and a second connector portion. The stator has a first winding arrangement configured for a first voltage and a second winding arrangement configured for a second voltage different from the first voltage. The first connector portion is selectively connectable to each of the first winding arrangement and the second winding arrangement. The selector is movable between a first position in which the first connector portion is connected to the first winding arrangement, and a second position in which the first connector portion is connected to the second winding arrangement. The second connector portion is electrically connected to a power supply and selectively engageable with the first connector portion to provide power to one of the first winding arrangement and the second winding arrangement.

18 Claims, 7 Drawing Sheets

U.S. PATENT DOCUMENTS

| | | |
|---|---|---|
| D297,726 S | 9/1988 | Araki |
| 4,775,766 A | 10/1988 | Kooy et al. |
| 4,937,482 A * | 6/1990 | Dohogne .................... 310/71 |
| 4,963,777 A | 10/1990 | Blum |
| 5,006,742 A | 4/1991 | Strobl et al. |
| 5,017,818 A | 5/1991 | Dohogne |
| 5,091,611 A | 2/1992 | Reeves et al. |
| 5,245,143 A | 9/1993 | James et al. |
| 5,245,237 A | 9/1993 | Fisher et al. |
| 5,370,550 A | 12/1994 | Alwine et al. |
| 5,430,931 A | 7/1995 | Fisher et al. |
| 5,543,671 A | 8/1996 | Williams |
| 5,593,022 A | 1/1997 | Schaeffer et al. |
| 5,885,102 A | 3/1999 | Harting et al. |
| 5,966,995 A | 10/1999 | Edwards, Jr. et al. |
| 6,040,646 A | 3/2000 | Peters |
| 6,048,219 A | 4/2000 | Kotowski |
| 6,106,324 A | 8/2000 | Kwapien et al. |
| 6,133,658 A * | 10/2000 | Fisher et al. .................. 310/89 |
| 6,479,913 B1 | 11/2002 | Lin |
| 6,657,338 B2 | 12/2003 | Fisher et al. |
| 6,657,339 B2 | 12/2003 | Herndon et al. |
| 6,856,056 B2 | 2/2005 | Lyle et al. |
| 6,882,070 B2 | 4/2005 | Staigl, III et al. |
| 6,882,072 B2 | 4/2005 | Wingett et al. |
| 2007/0176500 A1 | 8/2007 | Watkins et al. |

* cited by examiner

US 7,898,131 B2

EXTERNAL VOLTAGE CHANGE DEVICE

BACKGROUND

The present invention relates to electric machines and electrical connections thereto.

SUMMARY

In one construction, the invention provides a motor that includes a stator, a first connector portion, a selector, and a second connector portion. The stator has a first winding arrangement that is configured for a first voltage, and a second winding arrangement that is configured for a second voltage different from the first voltage. The first connector portion is selectively connectable to each of the first winding arrangement and the second winding arrangement. The selector is movable between a first position in which the first connector portion is connected to the first winding arrangement, and a second position in which the first connector portion is connected to the second winding arrangement. The second connector portion is electrically connected to a power supply and selectively engageable with the first connector portion to provide power to one of the first winding arrangement and the second winding arrangement.

In another construction the invention provides a motor that includes a motor housing, a stator positioned within the housing, a first connector portion positioned externally of the motor housing, a second connector portion positioned externally of the motor housing and selectively engageable with the first connector portion, and a selector. The stator has a first winding arrangement that is configured for a first voltage and a second winding arrangement that is configured for a second voltage different from the first voltage. The first connector portion is selectively connectable to each of the first winding arrangement and the second winding arrangement and includes a first electrical assembly. The second connector portion includes a second electrical assembly that is electrically connected to the first electrical assembly and a power supply to provide power to one of the first winding arrangement and the second winding arrangement. The second connector portion cooperates with the first connector portion to enclose a space in which the selector and at least a portion of the first electrical assembly and the second electrical assembly are disposed. The selector is coupled to the first connector portion and movable between a first position in which the first connector portion is connected to the first winding arrangement, and a second position in which the first connector portion is connected to the second winding arrangement.

Other aspects of the invention will become apparent by consideration of the detailed description and accompanying drawings.

DETAILED DESCRIPTION

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
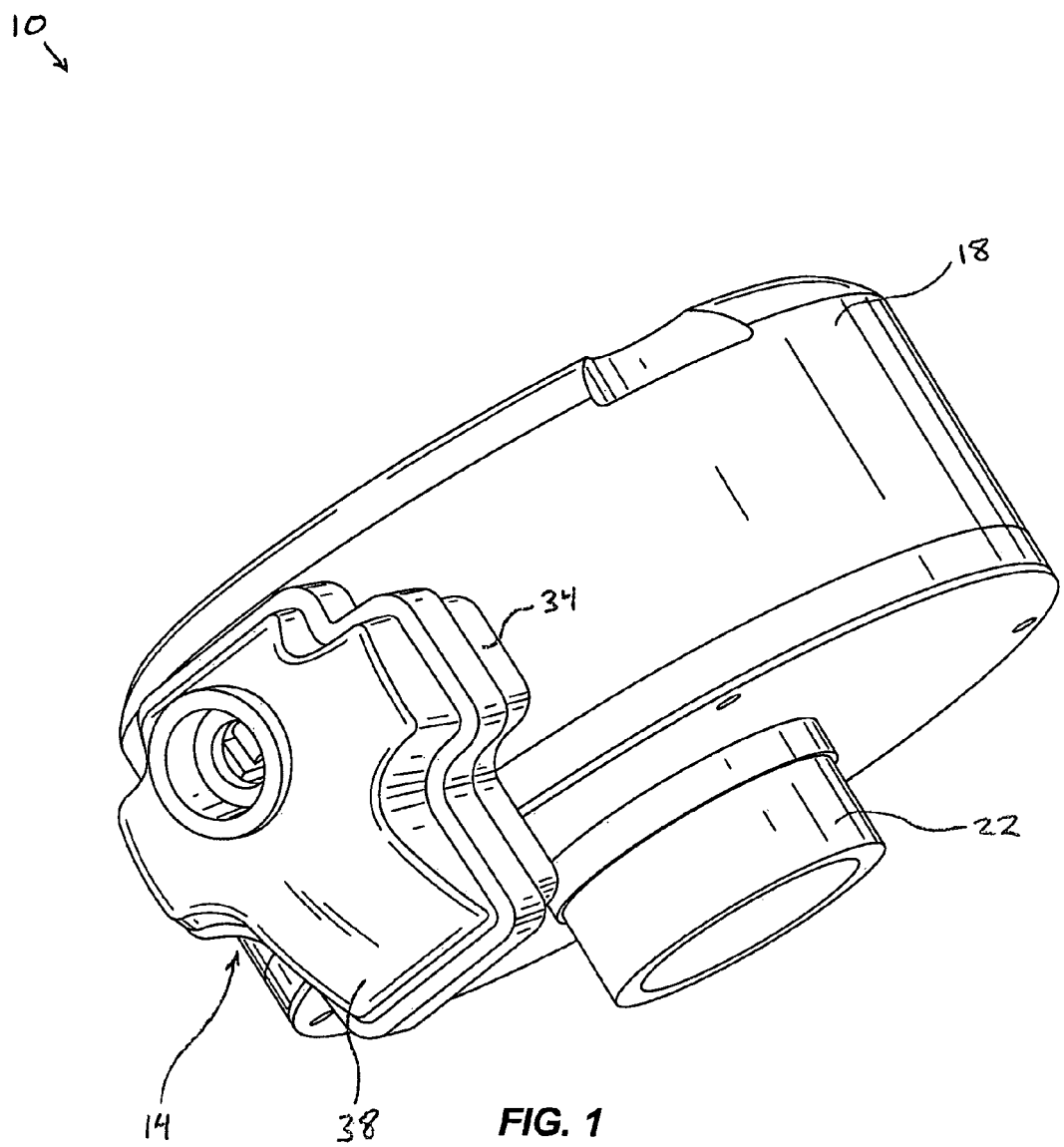
FIG. 1 is a perspective view of a motor and an external voltage change device.

FIG. 1 shows an electric motor 10 with an external voltage change device 14. The motor 10 includes a motor housing 18, an output shaft 22, a stator 26, and a rotor 30 (shown schematically in FIGS. 10 and 11). The illustrated motor 10 is a three-phase motor 10 that powers a pump (not shown), although the motor 10 may be used for other applications (e.g., fans, blowers, compressors, conveyor drives, etc.), as desired. In other constructions, the motor 10 may include other components, may be a single-phase motor, may be a variable speed motor, or may be a DC motor. In addition, other motor configurations exist and may be implemented, as desired.

The external voltage change device 14 includes a first connector portion 34 that is directly connected to the motor housing 18, and a second connector portion 38 that is selectively engageable with the first connector portion 34.

Figure 2:
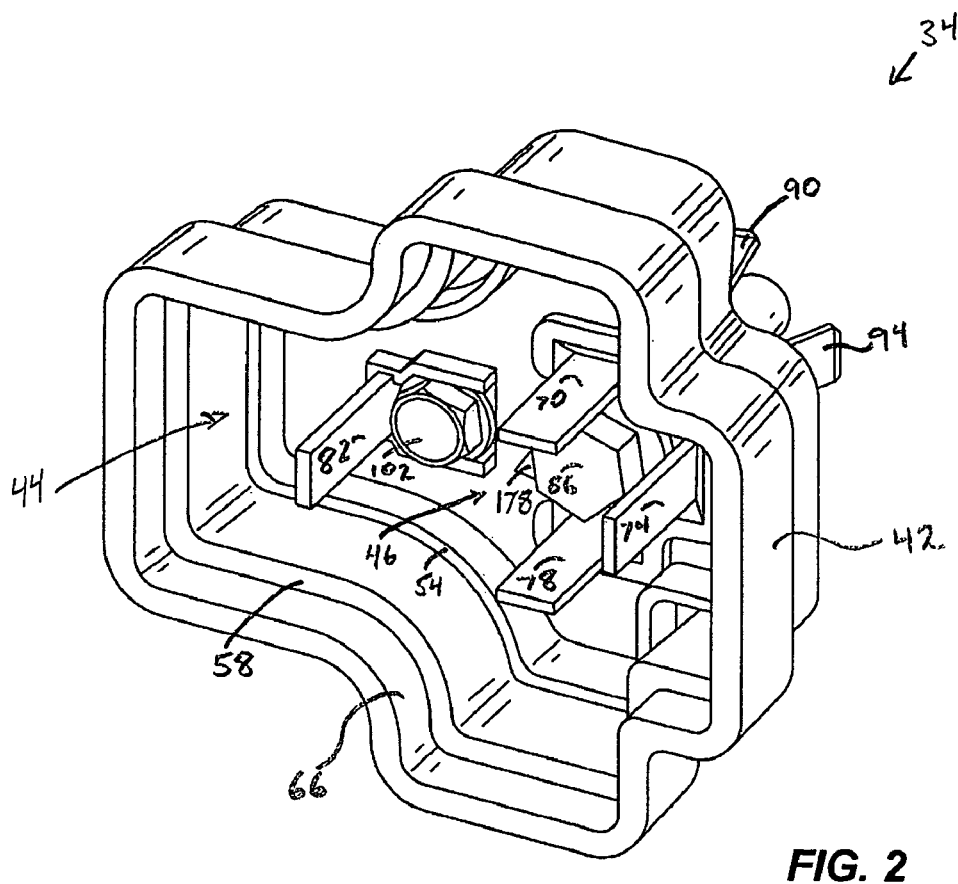
FIG. 2 is a perspective view of a first element of the external voltage change device of FIG. 1.
Figure 3:
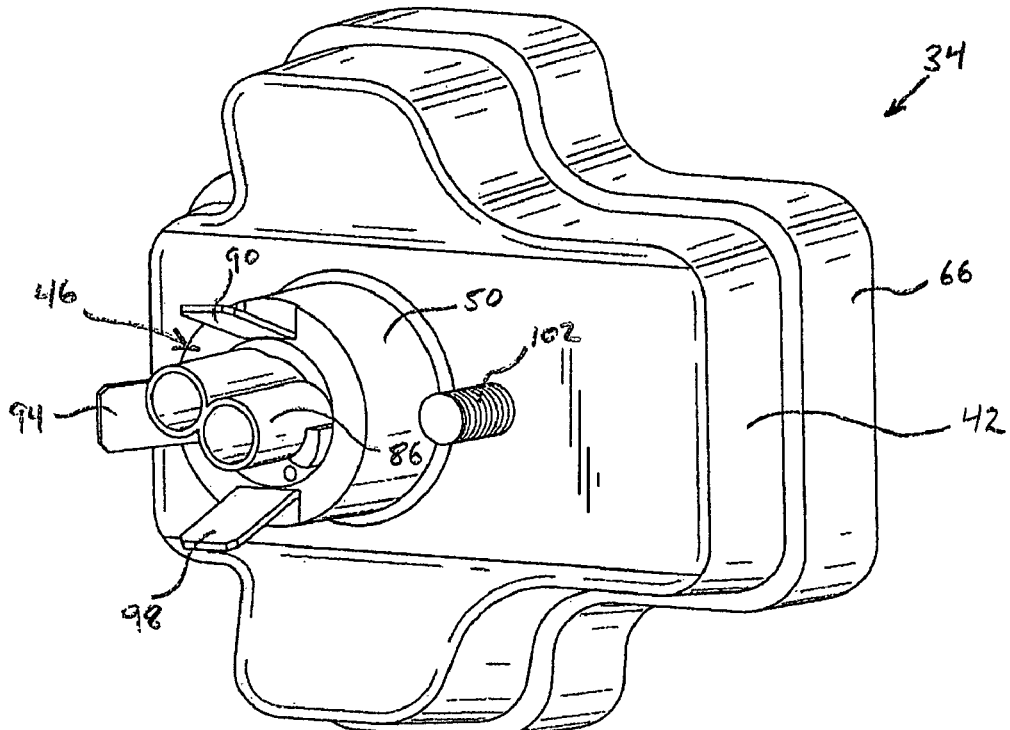
FIG. 3 is a perspective view of the first element of the external voltage change device of FIG. 1.

Turning now to FIGS. 2 and 3, the first connector portion 34 includes a first housing 42 that forms part of a space 44 and a first electrical assembly 46 positioned within the space 44. The first housing 42 provides an attachment portion 50 (see FIG. 3), a first sealing lip 54, a second sealing lip 58, and a shroud 66 that extends from the second sealing lip 58. The attachment portion 50 engages an aperture in the motor housing 18 and maintains the first connector portion 34 in a constant position and alignment with respect to the motor 10. The attachment portion 50 can be secured within the aperture with adhesives. In other constructions, the attachment portion may be secured with fasteners, a press-fit, spring-clips, or other securing devices, as desired.

The illustrated first housing 42 is formed from a material that protects the first electrical assembly 46 from physical damage (e.g., weather, impact, etc.), and insulates the first electrical assembly 46. In one construction, the first housing is formed from plastic. In other constructions, the first housing 42 may have a different shape (e.g., circular, square, etc.)

or may be constructed of a different material. In addition, the attachment portion 50 may have a different arrangement or may be eliminated and the first housing 42 attached to the motor housing 18 in another way (e.g., fasteners or adhesive), as desired.

With continued reference to FIGS. 2 and 3, the first electrical assembly 46 includes a first male contact 70, a second male contact 74, a third male contact 78, a fourth male contact 82, and a selector 86 that changes the configuration of the stator 26 (discussed in detail below). The first male contact 70 is in selective electrical communication with the stator 26 via a first terminal 90, the second male contact 74 is in electrical communication with the stator 26 via a second terminal 94, and the third male contact 78 is in selective electrical communication with the stator 26 via a third terminal 98.

The fourth male contact 82 is a ground contact in electrical connection with a ground stud 102 that passes through the first housing 42 and electrically connects to the ground of the motor 10. In the illustrated construction, the ground stud 102 is a threaded bolt that threads into the motor housing 18 to ground the circuit. The ground stud 102 adds additional support to the first connector portion 34 and inhibits the first connector portion 34 from changing position with respect to the motor 10. In other constructions, different grounding schemes may be used. For example, the ground stud 102 may be a post that is connected (e.g., soldered, crimped) to a wire that communicates with a ground circuit within the motor 10 such that the ground stud connects to ground. Other grounding arrangements may be used, as desired.

Figure 10:
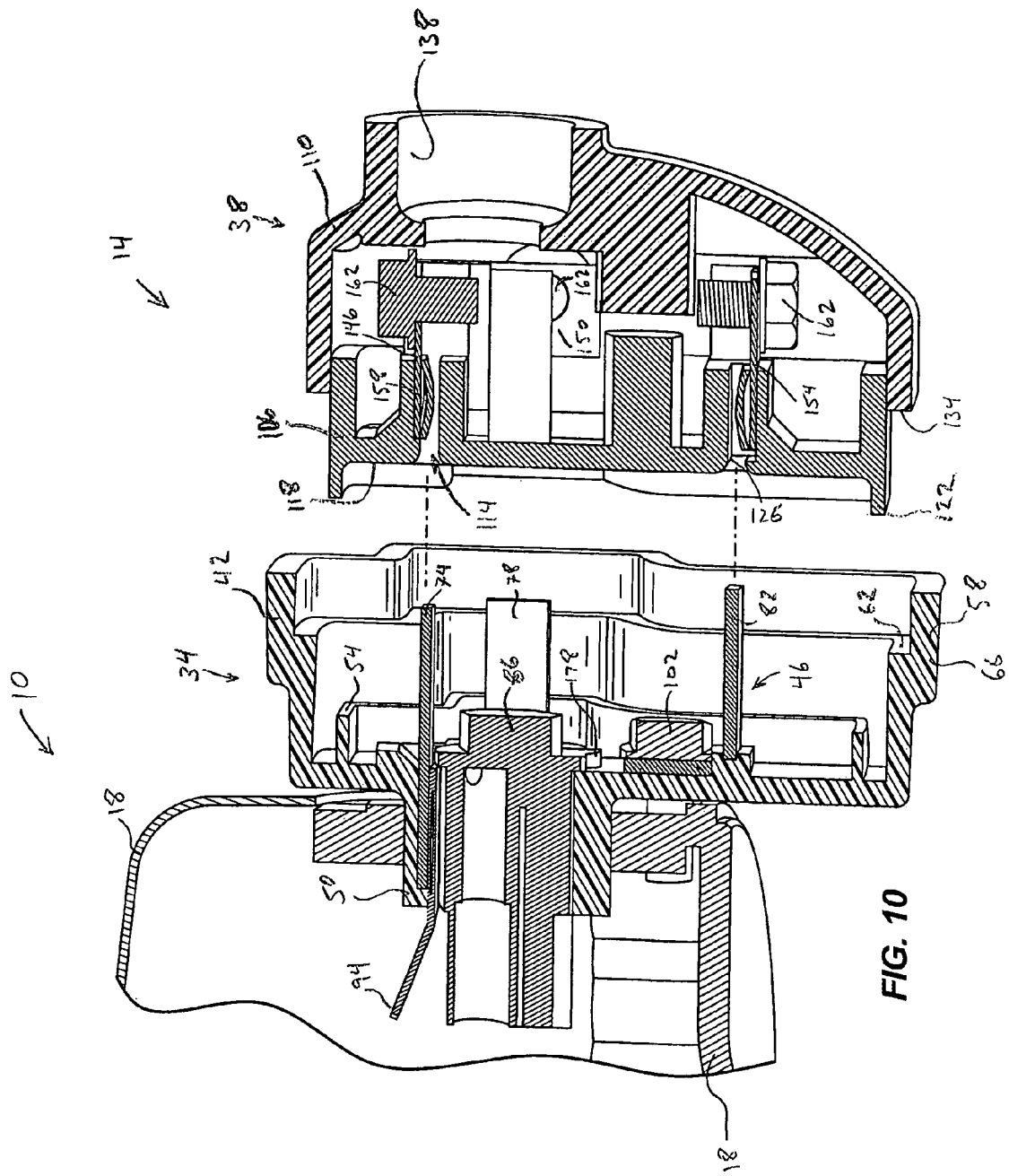
FIG. 10 is an exploded sectional view of the external voltage change device of FIG. 1.
Figure 11:
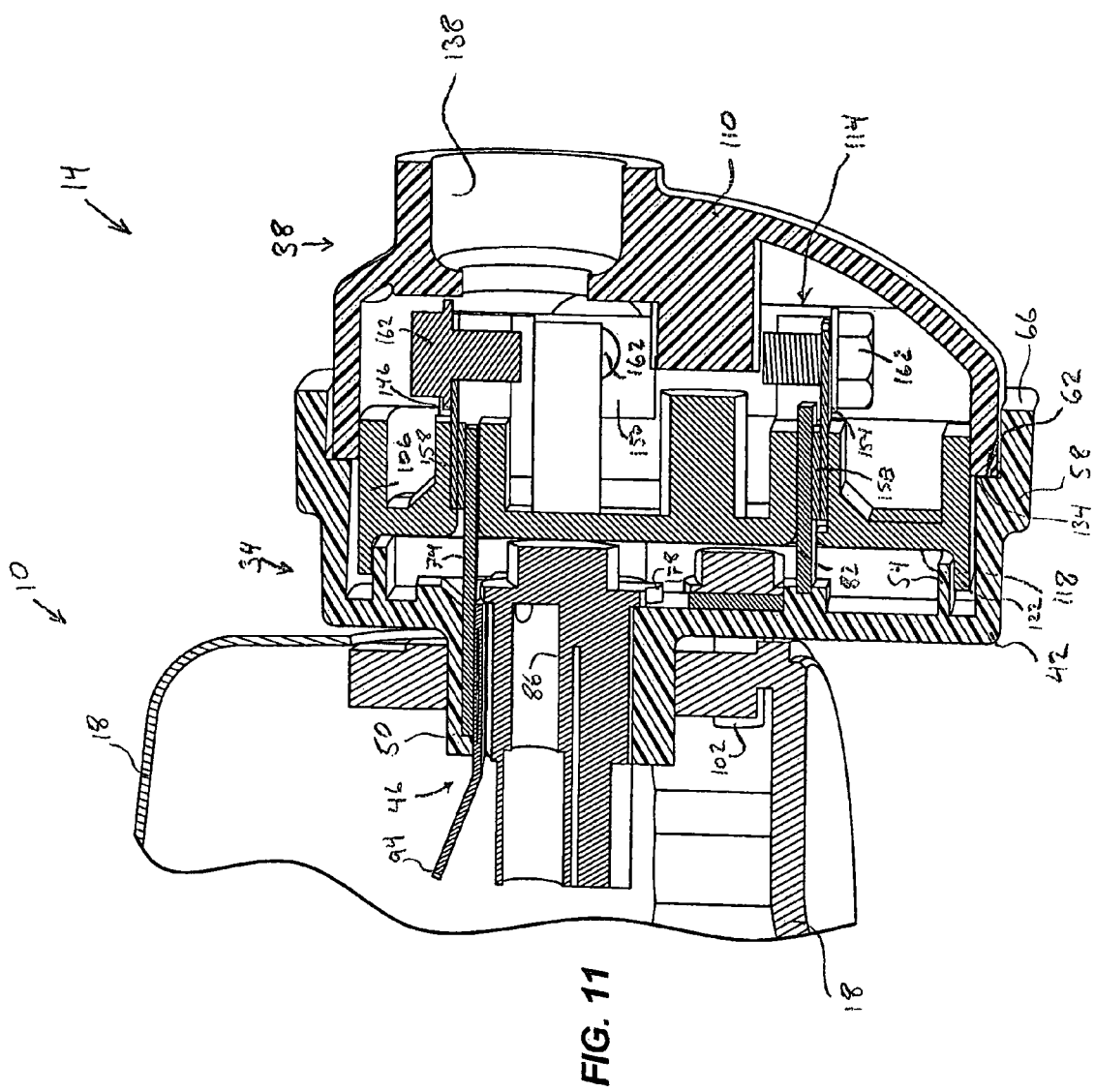
FIG. 11 is a sectional view of the external voltage change device of FIG. 1.

The second connector portion 38 is movable between a disconnected position wherein the second connector portion 38 is disengaged from the first connector portion 34 (see FIG. 10), and a connected position wherein the second connector portion 38 engages the first connector portion 34 (see FIG. 11).

Figure 4:
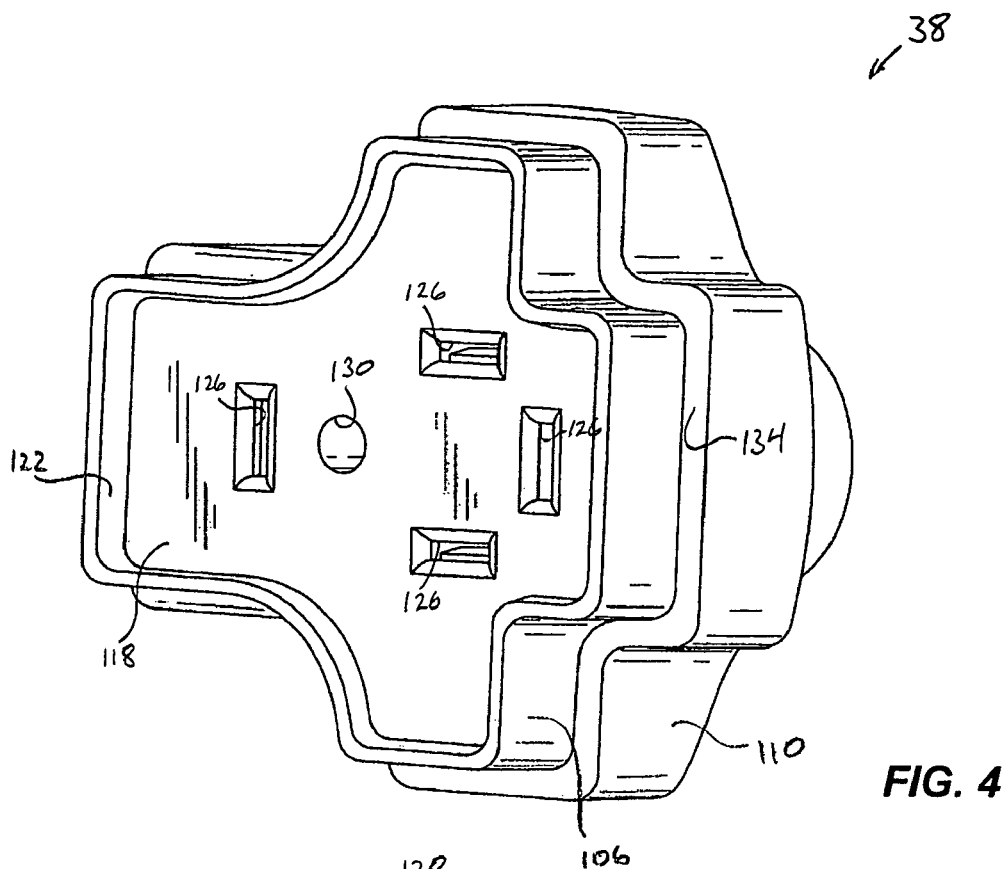
FIG. 4 is a perspective view of a second element of the external voltage change device of FIG. 1.
Figure 5:
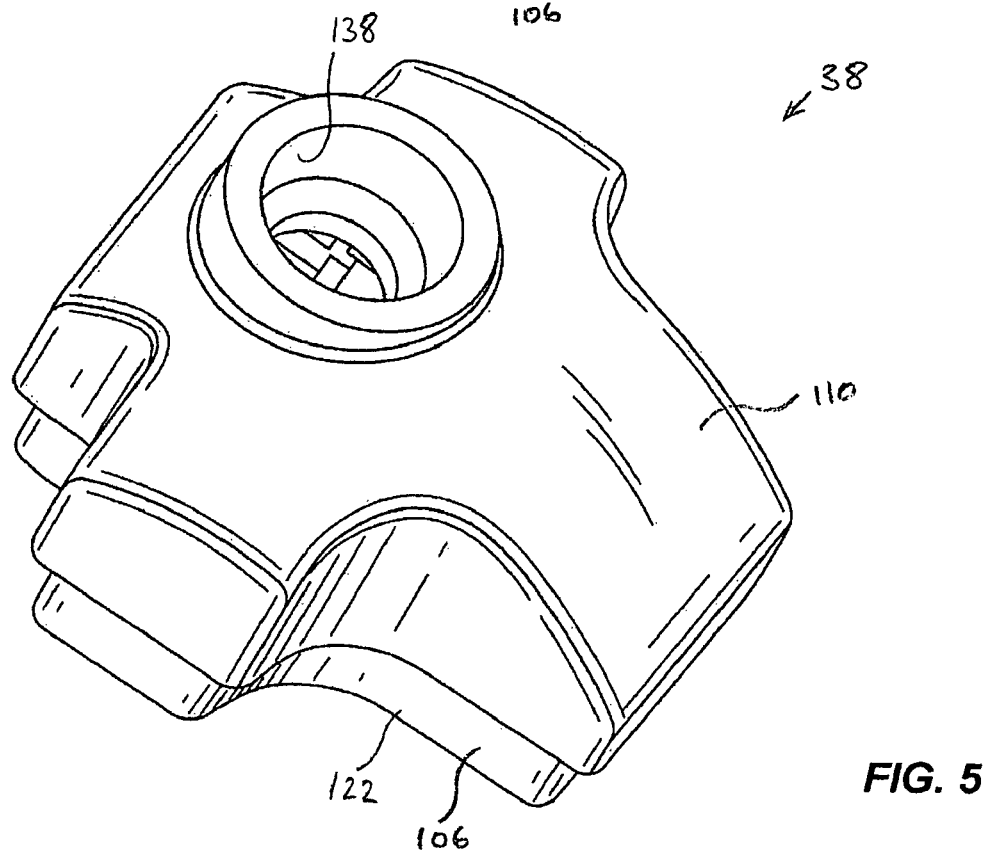
FIG. 5 is a perspective view of the second element of the external voltage change device of FIG. 1.
Figure 6:
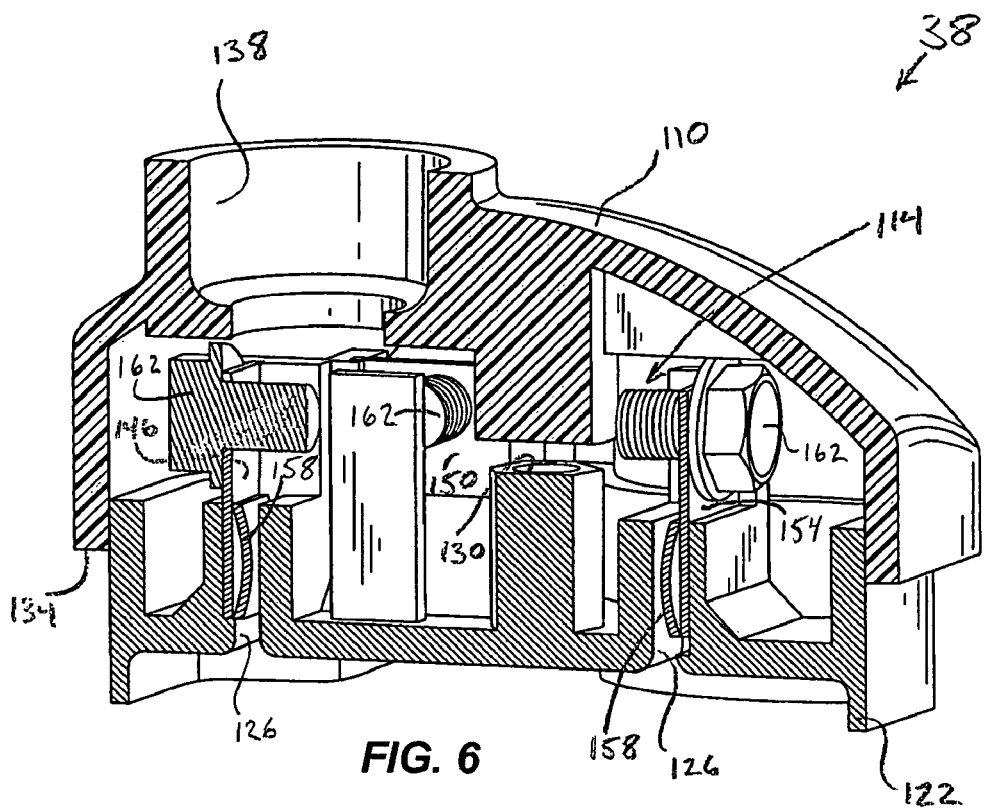
FIG. 6 is a sectional view of the second element of the external voltage change device of FIG. 1.
Figure 7:
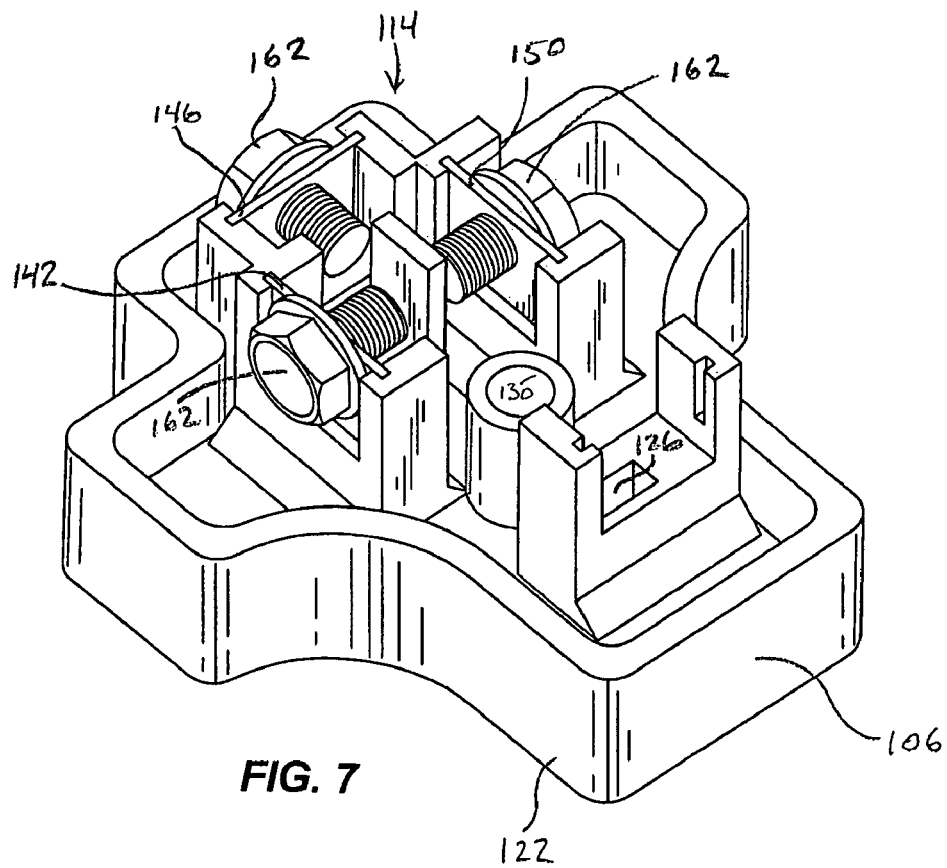
FIG. 7 is a perspective view of the second element of the external voltage change device of FIG. 1 with the cover removed.

With reference to FIGS. 4 and 5, the second connector portion 38 cooperates with the first connector portion 34 to form the space 44 and includes a second housing 106, a cover 110, and a second electrical assembly 114 at least partially position within the space 44 (see FIGS. 6 and 7). The illustrated second housing 106 includes a first mating surface 118 that engages the first sealing lip 54 of the first connector portion 34 and a second shroud 122 that surrounds the first sealing lip 54 when the second connector portion 38 is in the connected position (see FIG. 11). The first mating surface 118 assists to position the second connector portion 38 with respect to the first connector portion 34. In other constructions, the first mating surface 118 may engage the first sealing lip 54 differently, for example, an o-ring seal may be used.

The second housing 106 also includes four apertures 126 that are sized to receive the male contacts 70, 74, 78, 82 and provide electrical access to the second electrical assembly 114. A cover aperture 130 receives a fastener (not shown) that threads into the cover 110 to hold the cover 110 and the second housing 106 together as a single component.

The cover 110 engages the second housing 106 and includes a second mating surface 134 that engages the engaging surface 62 of the second sealing lip 58 when the second connector portion 38 is in the connected position (see FIG. 11), and a cable aperture 138 that receives power cables (not shown). The illustrated cable aperture 138 includes a collar that receives an electrical conduit that houses the power cables. In other constructions, the cover 110 may have a different shape or may be formed as a single piece with the second housing 106.

With reference to FIGS. 6 and 7, the second electrical assembly 114 includes a first female contact 142, a second female contact 146, a third female contact 150, and a fourth female contact 154 positioned within the second connector portion 38. Each female contact 142, 146, 150, 154 includes a spring plate 158 that engages the respective male contact 70, 74, 78, 82 when the second connector portion 38 is in the connected position. A contact stud 162 connects each female contact 142, 146, 150, 154 to a power cable such that power may be transmitted from a power supply (not shown) to the motor 10. FIG. 7 shows the fourth female contact 154 removed such that the aperture 126 of the second housing 106 is visible. Each female contact 142, 146, 150, 154 is removable such that the power cable may be connected to each female contact 142, 146, 150, 154 while removed from the second housing 106.

Figure 8:
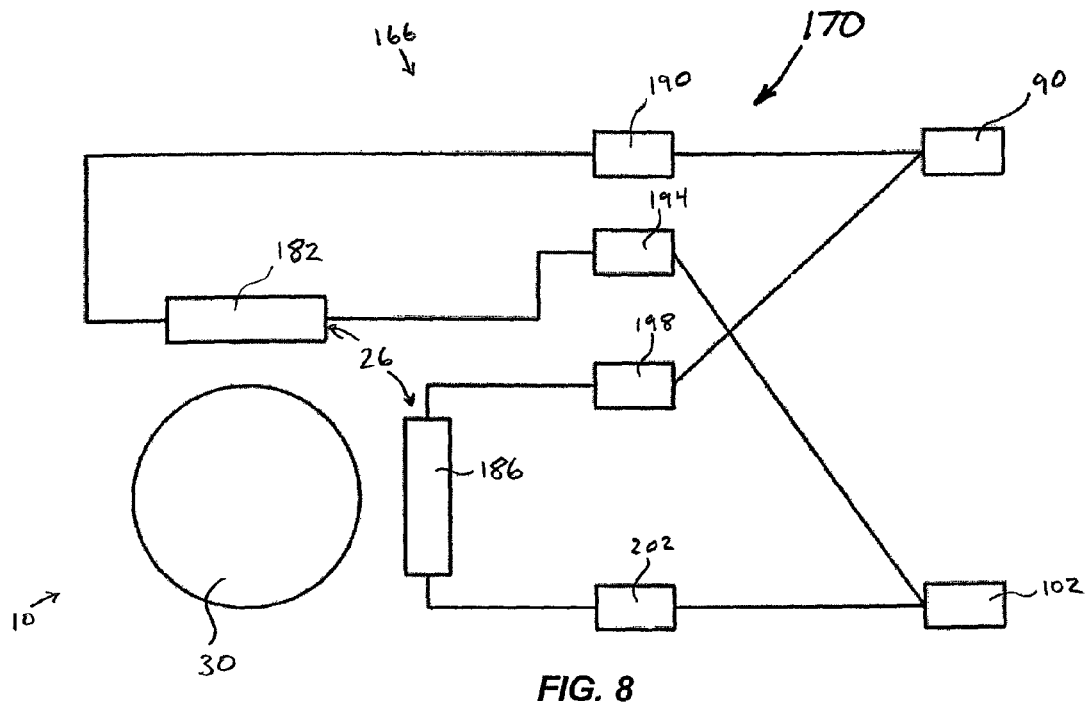
FIG. 8 is a schematic representation of the motor and external voltage change device of FIG. 1.
Figure 9:
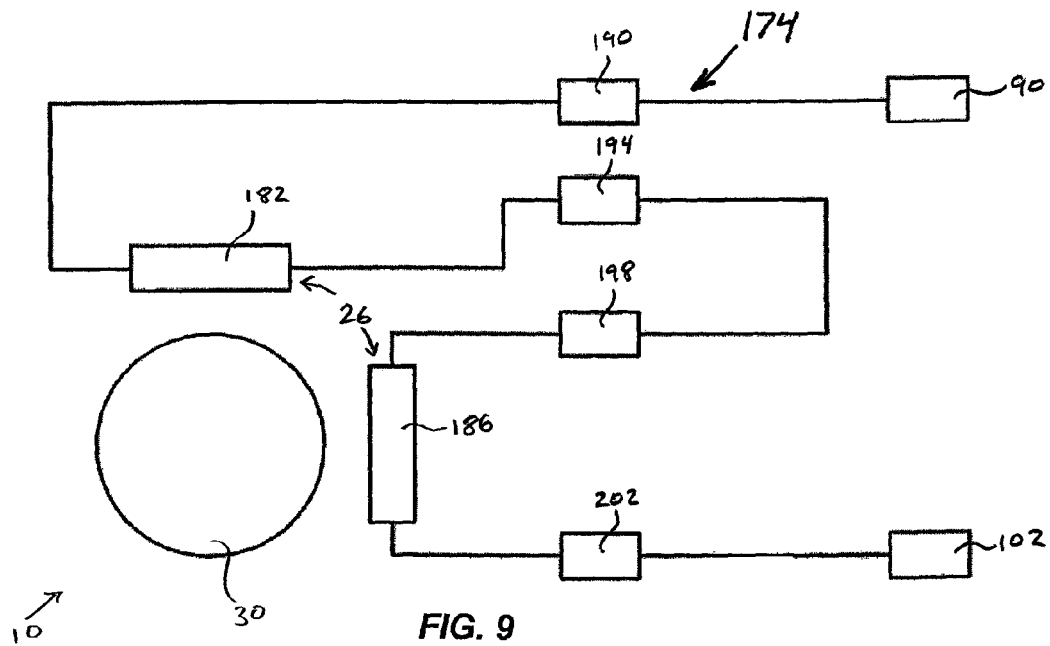
FIG. 9 is a schematic representation of the motor and external voltage change device of FIG. 1.

FIGS. 8 and 9 illustrate one phase winding 166 of the stator 26 with a first winding arrangement 170 (see FIG. 8) and a second winding arrangement 174 (see FIG. 9). The winding 166 includes a first coil 182 and a second coil 186. In some constructions, the coils 182, 186 only partially define the winding 166 with additional coils completing the winding 166. In a single-phase motor, the illustrated coils 182, 186 would define a two-pole stator. Of course, additional poles could be employed if desired.

FIG. 8 illustrates the stator configured with the first winding arrangement 170 in which the first coil 182 and the second coil 186 are arranged in parallel such that the full voltage applied between the first terminal 90 and the second terminal 94 is also present across both the first coil 182 and the second coil 186. In a three-phase motor, two additional coils would be connected in parallel to receive the voltage applied between the second terminal 94 and the third terminal 98, and two other coils would be connected in parallel to receive the voltage applied between the third terminal 98 and the first terminal 90.

FIG. 9 illustrates the stator configured with the second winding arrangement 174 in which the first coil 182 and the second coil 186 are arranged in series such that about half of the voltage applied across the first terminal 90 and the second terminal 94 is present across each of the first coil 182 and the second coil 186. In a three-phase motor, two additional coils would be connected in series to receive the voltage applied between the second terminal 94 and the third terminal 98, and two other coils would be connected in series to receive the voltage applied between the third terminal 98 and the first terminal 90.

As one of ordinary skill in the art will realize, other wiring arrangements and switch arrangements are possible and would function with the present invention. As such, the invention should not be limited to the arrangement illustrated in FIGS. 8 and 9.

The illustrated selector 86 is positioned between the male contacts 70, 74, 78, 82 such that the selector may only be accessed with a tool. This position makes unintentional movement of the selector difficult. The selector includes a hex-shaped head that may be gripped and rotated. An indicator 178 is formed with the hex-shaped head and indicates the position of the selector 86. The selector 86 is movable between a first position in which the first winding arrangement 170 is selected, and a second position in which the second winding arrangement 174 is selected. In the illustrated construction, the first position is selected when the power supply provides relatively low-voltage power (e.g., 115-volt power), and the second position is selected when the power supply provides relatively high-voltage power (e.g., 230-volt power). Moving the selector 86 between the first position and the second position changes the configuration of the stator such that the stator 26 operates with the first winding arrangement 170 or the second winding arrangement 174 depending on the position of the selector 86. In other constructions, different voltages may be provided by the power supply (e.g., 240-volt, 480-volt, etc.), as desired.

Thus, as can be seen, the same coils 182, 186 and many of the same electrical components are used to define two individual winding arrangements 170, 174 in the motor 10, and the selector 86 may be moved between the first position and the second position to select the appropriate winding arrangement 170, 174, for the power provided. Each winding arrangement 170, 174 is such that the voltage across each coil 182, 186 does not exceed the rated voltage for each coil. While each winding arrangement 170, 174 shares electrical components that are energized no matter which winding arrangement 170, 174 is selected, the different electrical connections make the operation of the winding arrangements 170, 174 and thus the winding arrangements 170, 174 themselves distinct. Thus, it should be understood that a motor 10 that includes a first winding arrangement 170 and a second winding arrangement 174 does not require two separate and distinct windings 166. Rather, all that is required is that the electrical connections within the motor 10 be rearrangeable to define two or more electrically distinct winding arrangements 170, 174.

In operation, a user attaches the first connector portion 34 to the motor 10 (as shown in FIGS. 10 and 11) such that the first terminal 90, the second terminal 94, the third terminal 98, and the ground stud 102 are connected appropriately. Then, the selector 86 is moved to either the first position or the second position to configure the winding arrangement of the stator 26 for either a first voltage (e.g., 115-volts) or a second voltage (e.g., 230-volts), as desired.

To connect the second connector portion 38 to the power supply, the power cable is passed through the cable aperture 138 in the cover 110 and the respective wires are connected to the contact studs on the female contacts. The fastener is then threaded through the cover aperture 130 into the cover 110 and the second housing 106 is secured to the cover 110.

The second connector portion 38 is then moved from the disconnected position (FIG. 10) to the connected position (FIG. 11) such that the female contacts 142, 146, 150, 154 engage the male contacts 70, 74, 78, 82 and power is provided to the motor 10. In the connected position the external voltage change device 14 inhibits damage to the first electrical assembly 46 and the second electrical assembly 114 such that power supplied to the motor 10 is substantially uninterrupted. In addition, the connector portions 34, 38 enclose the selector 86 within the space 44 such that the selector 86 cannot be accessed or moved while the second connector portion 38 and the first connector portion 34 are engaged.

The external voltage change device 14 provides an external electrical connection for the motor 10 such that the user does not need to open the motor housing 18 to wire the motor 10 while in the field. The second connector portion 38 may be completely removed from the motor 10 and is not confined by the physical location of the motor 10. In addition, if one desired to replace the motor 10, no rewiring is needed. Rather, the second connector portion 38 is disconnected from the old motor 10 and is connected to the first connector portion 34 of a new motor.

Various features and advantages of the invention are set forth in the following claims.

What is claimed is:

1. A motor comprising:
   a stator having a first winding arrangement configured for a first voltage and a second winding arrangement configured for a second voltage different from the first voltage;
   a first connector portion selectively connectable to each of the first winding arrangement and the second winding arrangement;
   a selector movable between a first position in which the first connector portion is connected to the first winding arrangement, and a second position in which the first connector portion is connected to the second winding arrangement; and
   a second connector portion electrically connected to a power supply and selectively engageable with the first connector portion to provide power to one of the first winding arrangement and the second winding arrangement, wherein the first connector portion and the second connector portion enclose a space, and wherein the selector is positioned within the space.

2. The motor of claim 1, wherein the first connector portion includes male contacts.

3. The motor of claim 2, wherein the selector is positioned between the male contacts.

4. The motor of claim 1, wherein the second connector portion includes female contacts.

5. The motor of claim 4, wherein the female contacts are removable.

6. The motor of claim 1, wherein the second connector portion includes a cover.

7. The motor of claim 1, wherein the second connector portion is movable between a disconnected position where the second connector portion is physically and electrically disconnected from the first connector portion, and a connected position where the second connector portion is physically and electrically connected to the first connector portion.

8. The motor of claim 1, wherein the first connector portion includes a shroud that covers a portion of the second connector portion.

9. A motor comprising:
   a motor housing;
   a stator positioned within the housing and having a first winding arrangement configured for a first voltage and a second winding arrangement configured for a second voltage different from the first voltage;
   a first connector portion positioned externally of the motor housing, selectively connectable to each of the first winding arrangement and the second winding arrangement, and including a first electrical assembly;
   a second connector portion positioned externally of the motor housing and including a second electrical assembly that is electrically connected to a power supply and selectively electrically connected to the first electrical assembly, the second connector portion selectively engageable with the first connector portion to provide power to one of the first winding arrangement and the second winding arrangement, the second connector portion cooperating with the first connector portion to enclose a space in which at least a portion of the first electrical assembly and the second electrical assembly are disposed; and
   a selector positioned within the space and coupled to the first connector portion, the selector movable between a first position in which the first connector portion is connected to the first winding arrangement, and a second position in which the first connector portion is connected to the second winding arrangement.

10. The motor of claim 9, wherein the first electrical assembly includes male contacts.

11. The motor of claim 10, wherein the selector is positioned between the male contacts.

12. The motor of claim 9, wherein the first winding arrangement and the second winding arrangement define a first phase, and wherein a third winding arrangement and a fourth winding arrangement define a second phase.

13. The motor of claim 9, wherein the second connector portion includes a cover.

14. The motor of claim 13, wherein the second connector portion includes a housing and the cover is secured to the housing to inhibit access to the second electrical assembly.

15. The motor of claim 9, wherein the second electrical assembly includes female contacts.

16. The motor of claim 15, wherein the female contacts are removable.

17. The motor of claim 9, wherein the second connector portion is movable between a disconnected position where the second connector portion is physically and electrically disconnected from the first connector portion, and a connected position where the second connector portion is physically and electrically connected to the first connector portion.

18. The motor of claim 9, wherein the first connector portion includes a shroud that covers a portion of the second connector portion.

* * * * *